United States Patent
Farquhar

Patent Number: 5,445,187
Date of Patent: Aug. 29, 1995

[54] CONDENSATE TRAPS

[75] Inventor: Keith R. Farquhar, Cheltenham, United Kingdom

[73] Assignee: Spirax-Sarco Limited, Cheltenham, United Kingdom

[21] Appl. No.: 260,826

[22] Filed: Jun. 16, 1994

[30] Foreign Application Priority Data

Jun. 22, 1993 [GB] United Kingdom ............. 9312843

[51] Int. Cl.$^6$ .................. F16T 1/38; F16K 11/085
[52] U.S. Cl. ................. 137/625.32; 137/182
[58] Field of Search ............ 137/601, 625.29, 625.32, 137/599.1, 599.2, 182

[56] References Cited

U.S. PATENT DOCUMENTS

| 1,677,148 | 7/1928 | Rosner | 137/625.29 |
| 3,106,937 | 10/1963 | Sands | 137/625.32 X |
| 3,428,089 | 2/1969 | Kachergis | 137/625.29 |
| 4,624,281 | 11/1986 | Vidal et al. | 137/599.2 |
| 5,095,943 | 3/1992 | Ashi | 137/599.2 |
| 5,107,896 | 4/1992 | Otto | 137/625.29 |

FOREIGN PATENT DOCUMENTS 0168781 11/1985 European Pat. Off. .
1393181 7/1975 United Kingdom .

OTHER PUBLICATIONS

Brochure, "Venn. ATB-5", No Date.
"Fushiman" Brochure–as described in U.S. Pat. No. 5, 0955,943.

Primary Examiner—Stephen M. Hepperle
Attorney, Agent, or Firm—Willian Brinks Hofer Gilson & Lione

[57] ABSTRACT

A condensate trap assembly comprises a valve body 2 and a condensate trap 4 releaseably secured to the valve body 2. The valve body 2 has an inlet and an outlet and accommodates a valve element which is movable between three operative positions in which respectively:

(i) the inlet is isolated from the condensate trap 4 and from the outlet,
(ii) the inlet communicates directly with the outlet, by passing the condensate trap 4; and
(iii) the inlet communicates with the outlet through the condensate trap 4.

The valve element is housed for rotation within the valve body 2 so that the operative position of the valve is determined by the angular position of the valve element, which is controlled by an adjustment knob 12.

8 Claims, 8 Drawing Sheets

BYPASS

TRAP

CONDENSATE TRAPS

BACKGROUND OF THE INVENTION

This invention relates to condensate traps, and more particularly to condensate traps having a by-pass/isolating valve.

Condensate traps are commonly used in steam systems (in which circumstances they are usually referred to as steam traps). Their function is to discharge condensed water from the system, without allowing steam to escape. If steam is lost from the system, this represents a waste of energy. Steam traps thus commonly comprise a valve which is responsive to the presence of condensate or steam in the vicinity of the valve, so that the valve opens when condensate is present and closes when steam is present.

It is usual to provide isolating valves on the inlet and outlet sides of the steam trap so that the steam trap can be isolated from the steam system for servicing or replacement. Sometimes, the pipework includes a valve-controlled bypass so that steam or condensate can flow directly from the inlet side of the steam trap to the outlet side without passing through the steam trap itself. The required additional valves and pipework introduce complexity and expense to the installation.

SUMMARY OF THE INVENTION

According to a first aspect of the present invention, there is provided a condensate trap assembly comprising a valve body and a condensate trap releasably secured to the valve body, the valve body having an inlet and an outlet and accommodating a valve element which is movable between three operative positions in which respectively (i) the inlet is isolated from the condensate trap and from the outlet, (ii) the inlet communicates directly with the outlet, by-passing the condensate trap, and (iii) the inlet communicates with the outlet through the condensate trap.

According to a second aspect of the present invention, there is provided a condensate trap assembly comprising a valve body provided with a valve chamber which is partially occupied by a valve element, the valve body having an inlet passage and an outlet passage which open into the valve chamber at respective ports, seals being disposed at the inlet and outlet passage ports, which seals contact the surface of the valve element thereby sealing the inlet and outlet passages from the unoccupied region of the valve chamber, the valve element being disposed within the chamber for movement between three operative positions, in which, respectively:

(i) the inlet passage port and the outlet passage port are closed by the valve element;

(ii) the inlet passage port communicates with the outlet passage port through a first passageway in the valve element, and (iii) one of the inlet passage port and the outlet passage port communicates with the unoccupied region of the valve chamber through a second passageway in the valve element, and the other of the inlet passage port and the outlet passage port communicates with a transfer duct through a third passageway in the valve element, direct communication between the transfer duct and the unoccupied region of the valve chamber being prevented.

Preferably the valve element is housed for rotation within the valve body. Thus the operative position of the valve is determined by the angular position of the valve element. Preferably, the inlet and the outlet passages are aligned on a common axis. The axis of rotation of the valve element may be perpendicular to the common axis of the inlet and outlet passages, although the axis of rotation may alternatively be parallel to this common axis. In a preferred embodiment, the valve element is part-spherical in shape, although it may be part-conical or cylindrical.

The connection between the condensate trap and the valve body of the assembly according to the first aspect of the present invention may be such as to allow relative rotation between the condensate trap and the valve body to facilitate installation of the assembly into an existing steam system.

In a condensate trap assembly in accordance with the second aspect of the present invention, the transfer duct may open into the valve chamber at a respective port which is disposed on the axis of rotation of the valve element. Alternatively, the assembly may further comprise a steam trap element which is secured to the valve element. In this case, the transfer duct is defined by the assembly of the steam trap element and the valve element. The steam trap element preferably has an inlet and an outlet, one of which communicates with the transfer duct and the other of which communicates with the unoccupied region of the valve chamber.

The second passageway in the valve element may be offset from the axis of rotation of the valve element so as to communicate with the unoccupied region of the valve chamber in all operative positions of the valve element.

DETAILED DESCRIPTION OF THE INVENTION

Figure 1:
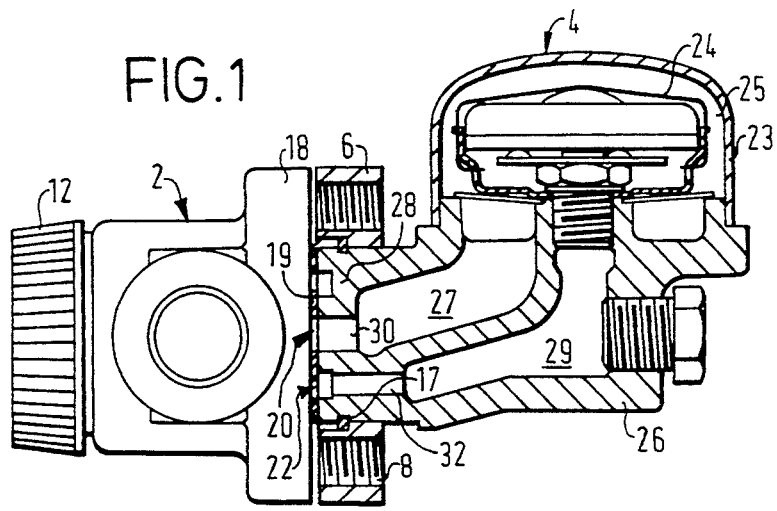
FIG. 1 is a side view of a condensate trap assembly comprising a valve body and a condensate trap, releasably secured together.
Figure 2:
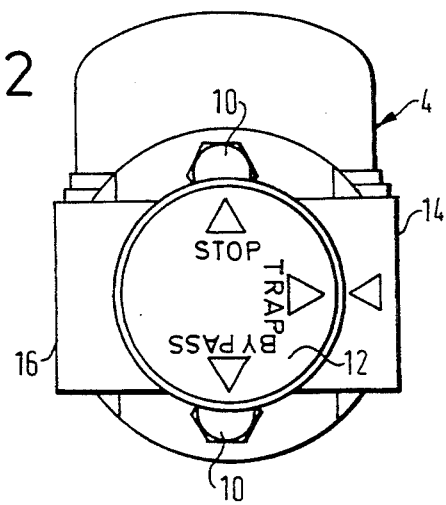
FIG. 2 is an end view of the assembly of FIG. 1.

The condensate trap assembly shown in FIG. 1 comprises a valve body 2 which is releasably connected to a condensate trap 4. The condensate trap 4 is connected to the valve body 2 by a securing ring 6 having two threaded bores 8 which receive threaded fasteners 10. The valve body 2 has an adjustment knob 12 which enables selection between three operative modes of the valve body 2. The valve body 2 has an inlet passage 14 and an outlet passage 16. The valve body 2 also has a connection face 18 having transfer ports 20 and 22. The operative modes of the valve body 2 determine which fluid connections are made between the inlet passage 14, the outlet passage 16 and the ports 20,22.

The condensate trap 4 comprises a body 26 having a cap 23 which encloses a trap chamber 25 accommodating a trap element 24. The body 26 has a connection region 28 having an inlet port 30 and an outlet port 32. A passage 27 connects the inlet port 30 to the chamber 25, and a passage 29 connects the outlet port 32 to the chamber.

A gasket 19 provides a seal between the connection face 18 and the connection region 28. The connection region 28 of the condensate trap 4 has an outer rib 17 which is engaged by a lip of the securing ring 6. The connection surface 28 and the connection face 18 are held together by the securing ring 6 such that the ports 20,22 cooperate, through apertures provided in the gasket 19, with the inlet port 30 and the outlet port 32 respectively.

The connection between the valve body 2 and the condensate trap 4 enables relative rotation between the valve body and the trap 4. For this reason, the first port 20 is located on the axis of relative rotation and the transfer port 22 and/or the trap outlet port 32 has an annular shape, being disposed about the axis of relative rotation.

In the valve arrangements shown in FIGS. 3 to 7, the valve body 2 comprises a housing 34 which defines the inlet passage 14 and the outlet passage 16. The inlet and outlet passages 14,16 are coaxially aligned on an axis 15. The housing 34 receives a valve element 36 for rotation, by means of an operating spindle 37, about a rotation axis which is perpendicular to the common axis 15 of the inlet passage 14 and the outlet passage 16. The valve element 36 comprises a body within which there are provided flow passageways 38 which terminate at ports 40 on the outer surface of the body 36. According to the angular position of the valve element 36, the passageways 38 determine the fluid connections between the inlet and outlet passages 14,16 and the transfer ports 20,22. Also, in the arrangements shown in FIGS. 3 to 6, the outlet passage 16 of the valve body communicates directly through a connecting passage 21 with the transfer port 22 of the connection face.

Figure 3:
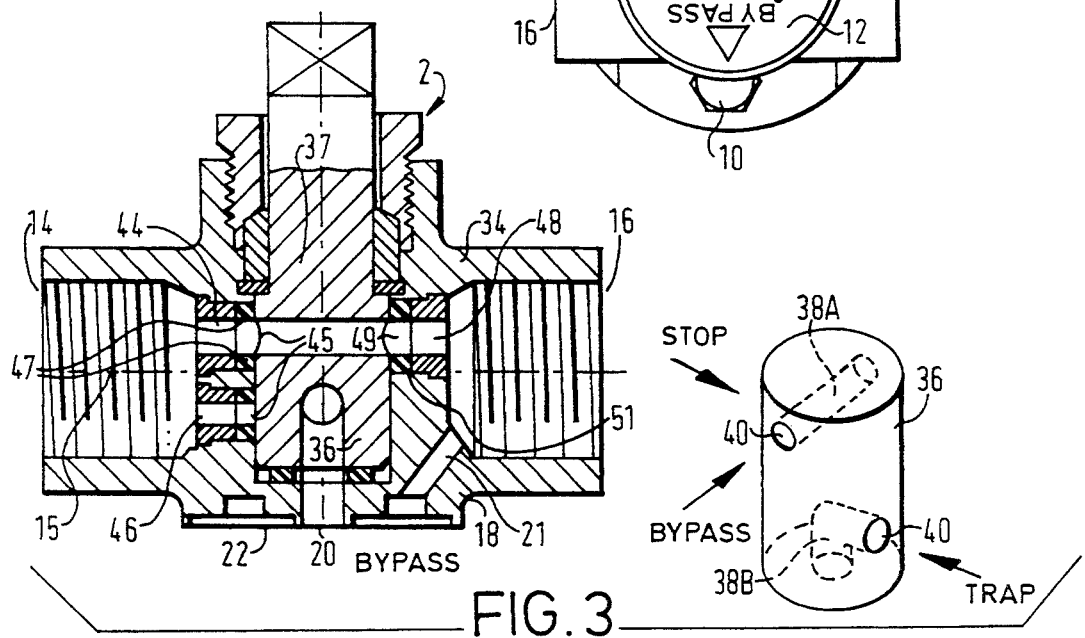
FIG. 3 is a sectional view of a valve arrangement in the assembly of FIG. 1.

In the embodiment shown in FIG. 3, the valve element 36 is cylindrical, and the longitudinal axis of the cylinder corresponds with the axis of rotation.

First and second connecting passages 44,46 within the housing 34 of the valve body 2 connect the inlet passage 14 to ports 45, provided with seals 47, at a surface region of the valve element 36. These two connecting passages meet the valve element 36 at different axial positions along its length. A third connecting passage 48 connects the outlet passage 16 to a port 49, provided with a seal 51, at a diametrically opposite surface region of the valve element 36.

The element 36 has two flow passageways. The first flow passageway 38A extends diametrically through the valve element 36 at an axial position along the cylindrical valve element 36 which corresponds with the position of the first and third connecting passages 44,48. A second flow passageway 38B extends radially inwardly from the outer surface of the valve element 36, at an axial position which corresponds with the position of the second connecting passage 46, to a central portion thereof, and then extends axially to an end region of the valve element 36 away from the operating spindle 37. Thus, there is a port in one end of the cylindrical element 36 which cooperates with the transfer port 20 of the connection face 18. The first passageway 38A and the radial portion of the second passageway 38B are perpendicular to each other.

Figure 4:
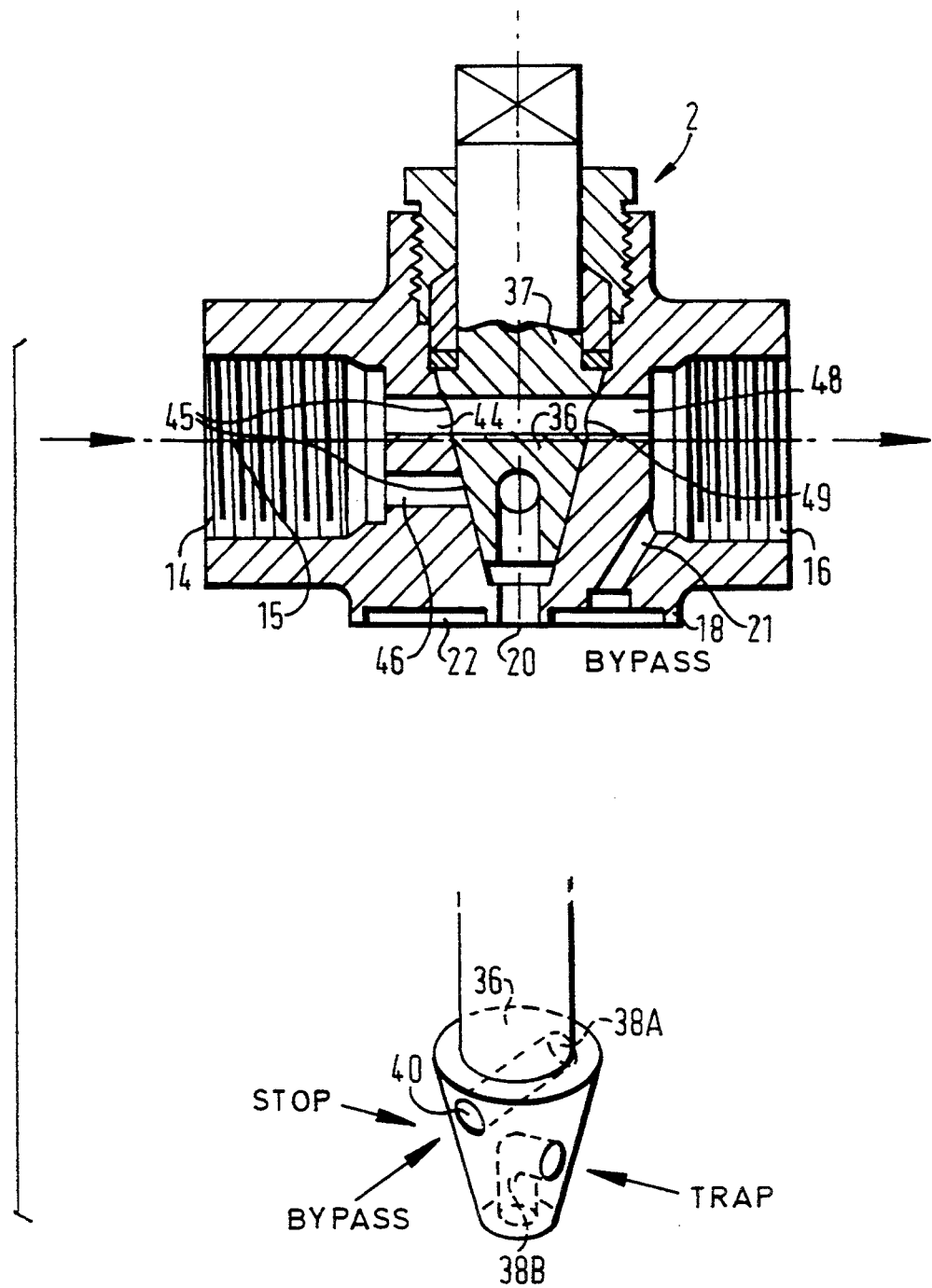
FIG. 4 corresponds to FIG. 3 but shows another form of valve arrangement.

The embodiment of the valve body shown in FIG. 4 is of almost identical construction to that shown in FIG. 3 and like components are given the same reference numerals. However, in the embodiment shown in FIG. 4, the valve element 36 is part conical in shape, the valve element 36 tapering in the direction towards the port 20. The conical shape of the valve element 36 means that seals corresponding to the seals 47 and 51 of FIG. 3 are not required.

Figure 5:
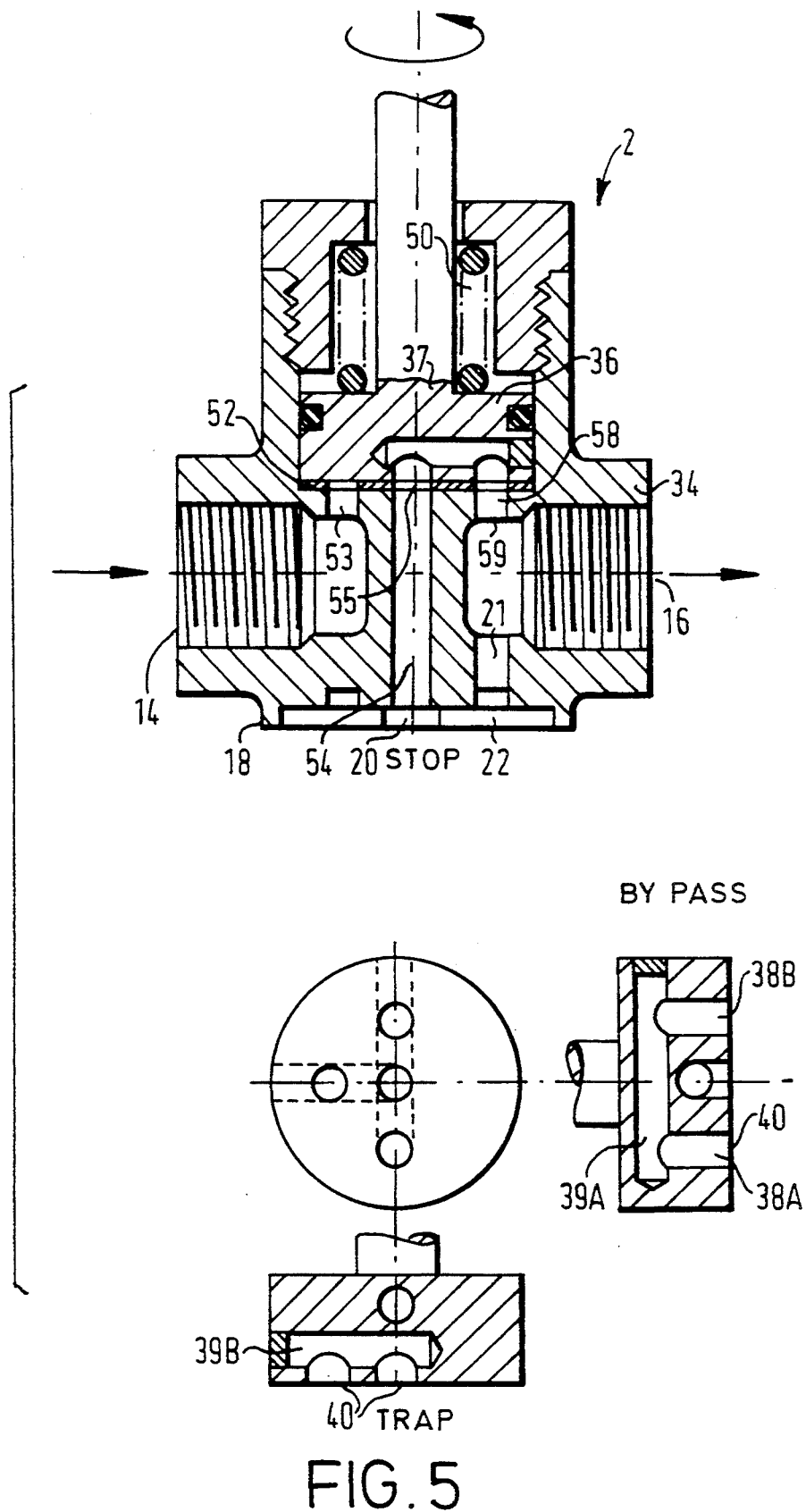
FIG. 5 corresponds to FIG. 3 but shows a third form of valve arrangement.

In the embodiment of the valve body shown in FIG. 5 the valve element 36 is cylindrical and the flow passageways 38 extend axially, the ports 40 being located on the circular end portion of the valve element 36. Internal passageways 39, which extend diametrically, provide appropriate internal connection of the passageways 38. Within the body 34 of the valve body 2, connecting passages 52,54 are provided which extend parallel to the axis of rotation of the valve element 36. The first connecting passage 52 terminates at a port 53 and connects the inlet passage 14 to the end region of the valve element 36. The second connecting passage 54 terminates at a port 55 and connects the transfer port 20 of the valve body 2 to the end portion of the valve element 36. The connecting passage 21 connecting the outlet passage 16 to the transfer port 22 of the valve body 2 also extends parallel to the axis of rotation of the valve element 36. A connecting passage 58 extends between a port 59 and the outlet passage 16.

The end portion of the valve element 36 has four ports. One port is located centrally, and the remaining three ports are located at the same radial distance as each other from the axis of rotation. A first and a second passageway 38A,38B extend parallel to the axis of rotation from two of the ports which are located at diametrically opposite regions of the end portion of the valve element 36. The passageways 38A,38B are connected by a first internal passageway 39A. The remaining two ports are connected by a second internal passageway 39B. The first and second internal passageways 39A,39B are perpendicular to each other.

In the embodiment shown in FIG. 5, a spring 50 provides a seating force acting against the valve element 36.

Figure 6:
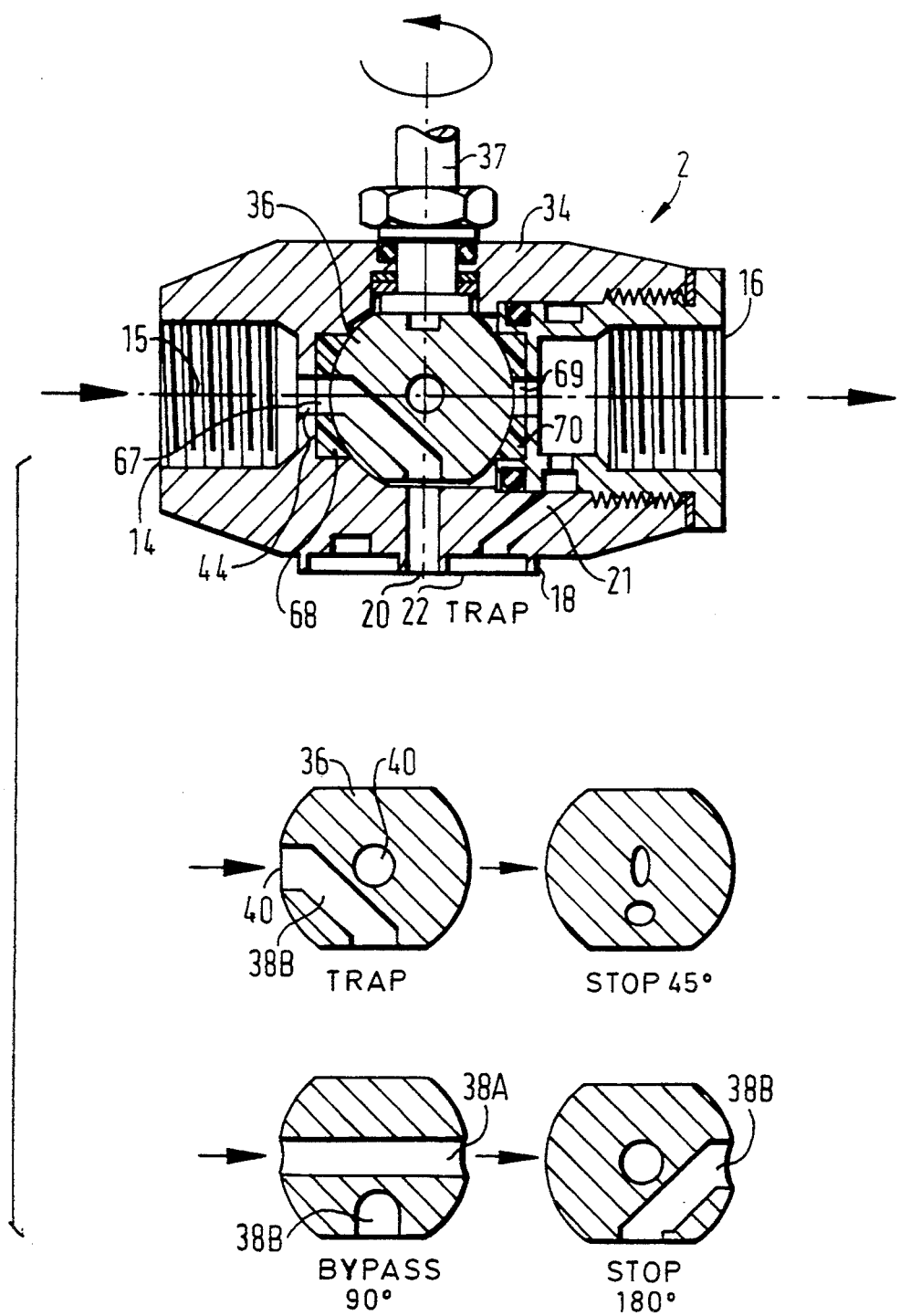
FIG. 6 corresponds to FIG. 3 but shows a fourth form of valve arrangement.

In the embodiment of the valve body 2 shown in FIG. 6, the valve element has a part spherical configuration. As in the embodiment shown in FIGS. 3 and 4, the valve element 36 has a first passageway 38A which extends across the valve element 36, and a second, perpendicular, passageway 38B which extends from a side portion of the valve element 36 to a base portion thereof. However, in the embodiment shown in FIG. 6 there is only one connecting passage 44 between the inlet passage 14 of the valve body 2 and the valve element 36. This is achieved by having the ports of the first connecting passageway 38A at the same axial location as one port of the second connecting passageway 38B. Seals 68,70 are provided adjacent the valve element 36 at ports 67,69.

Figure 7:
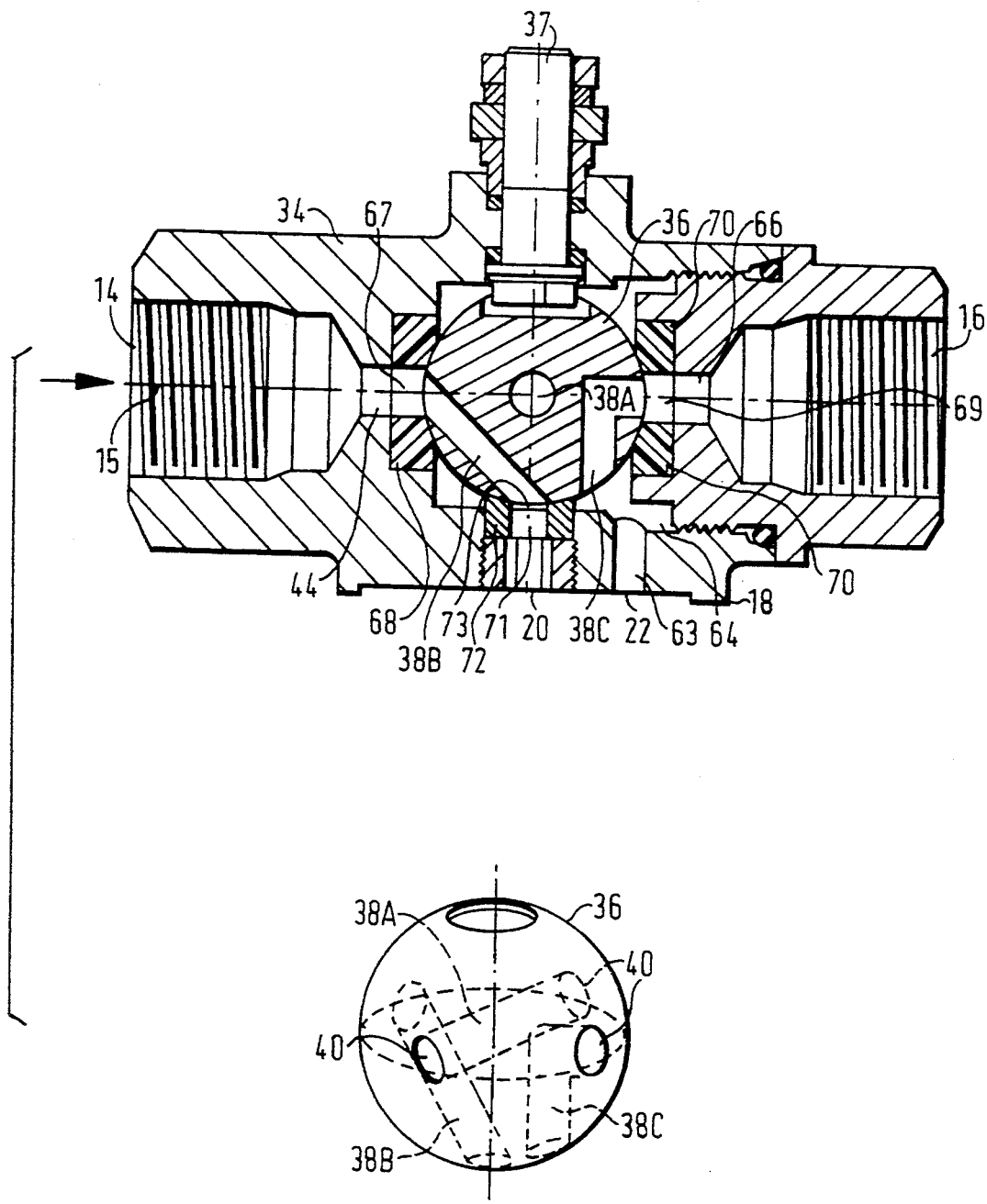
FIG. 7 corresponds to FIG. 3 but shows a fifth form of valve arrangement.

In the embodiment of the valve body 2 shown in FIG. 7, the valve element also has a part spherical configuration. The valve element 36 has a first passageway 38A which extends across the valve element 36, and a second, perpendicular, passageway 38B which extends from a side portion of the side element 36 to a base portion thereof. In the embodiment of the valve body 2 shown in FIG. 7, there is no connecting passage which directly connects the outlet passage 16 of the valve body with the transfer port 22 of the connection face (such as the connecting passage 21 in the embodiments shown in FIGS. 3 to 6). Instead, a third connecting passageway 38C within the valve element 36 enables the outlet passage 16 to be connected to the transfer port 22. The transfer port 22 communicates through a transfer duct 63 with a space 64 and the third connecting passageway 38C opens, at one end, into the space 64, in, all positions of the valve element. At the appropriate angular position, the opposite end of the third connecting passageway 38C communicates with the outlet passage 16. The third connecting passageway 38C lies in a plane perpendicular to the first passageway 38A and the port of the third connecting passageway 38C which opens into the space 64 is disposed at a position offset from the rotary axis of the valve element 36. The other port of the third connecting passageway 38C is disposed at the same axial position as the ports of the first connecting passageway 38A and one of the ports of the second connecting passageway 38B. Thus, there is only one connecting passage 44 between the inlet passage 14 of the valve body 2 and the valve element 36, and there is only one passage 66 extending inwardly from the outlet passage 16. A first seal 68 is provided at a port 67 at the end of the passage 45 adjacent the valve element 36 and a second seal 70 is provided at a port 69 at the end of the passage 66 adjacent the valve element 36. A transfer duct 71 extends from the transfer port 20 and terminates at a port 73 adjacent the valve element 36, where it is provided with a seal 72. The space 64 is formed by the clearance between the valve element 36 and the wall of the chamber 35, and is isolated from the outlet passage 16 and from the transfer port 20 respectively by means of the second and third seals 70,72. Thus, three seals 68,70,72 are required in total to ensure correct operation in all operative angular positions of the valve element 36.

Figure 8:
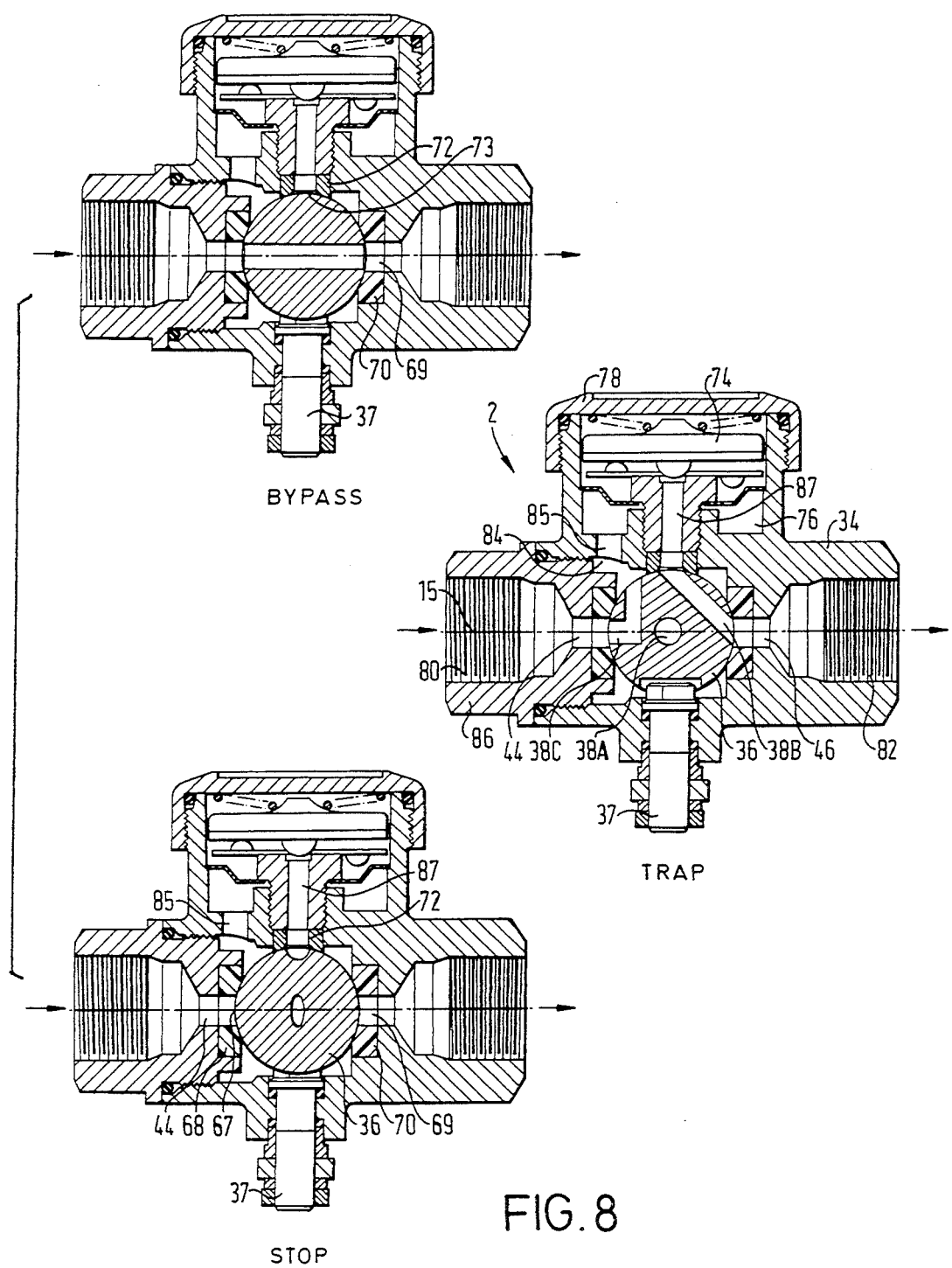
FIG. 8 shows a unitary design of steam trap with by-pass/isolating valve arrangement based on that shown in FIG. 7.

FIG. 8 shows a trap assembly comprising a steam trap with by-pass/isolating valve integrally formed as a single unit. A steam trap capsule 74 is accommodated within a chamber 76 which is formed within the integral housing 34. The chamber 76 is closed by a cap 78. The construction of the by-pass/isolation valve corresponds largely to that shown in FIG. 7. Thus, the valve element 36 has a part-spherical configuration having the three passageway 38A, 38B and 38C, corresponding to those shown in FIG. 7. However, the direction of the flow across the valve element 36, through the housing 34, is reversed. The valve body 2 has an inlet passage 80 and an outlet passage 82. In the embodiment shown in FIG. 8, the third connection passageway 38C enables the inlet passage 80 to be connected to a space 84 which communicates through a transfer duct 85 with the inlet side of the steam trap capsule 74. The space 84 is formed between the integral housing and an inlet fitting 86. The inlet fitting 86 is removable to provide access to the valve element 36.

The outlet side of the steam trap capsule 74 is connected to the valve chamber by a transfer duct 87. The second connecting passageway 38B enables the outlet side of the steam trap capsule 74 to be connected to the outlet passage 82. As in the embodiment of the valve assembly shown in FIG. 7, the inlet passage 80 and the outlet passage 82 are each connected to the valve element 36 by means of a single passage, 44,46. Three seals 68,70,72 are provided adjacent the valve element 36 at ports 67,69,73 at the end of each of the inlet passage 80, the outlet passage 82 and the transfer duct 87, respectively. The space 84 is isolated from the passages 80,82 and from the transfer duct 87 by means of the seals 68,70,72.

Figure 9:
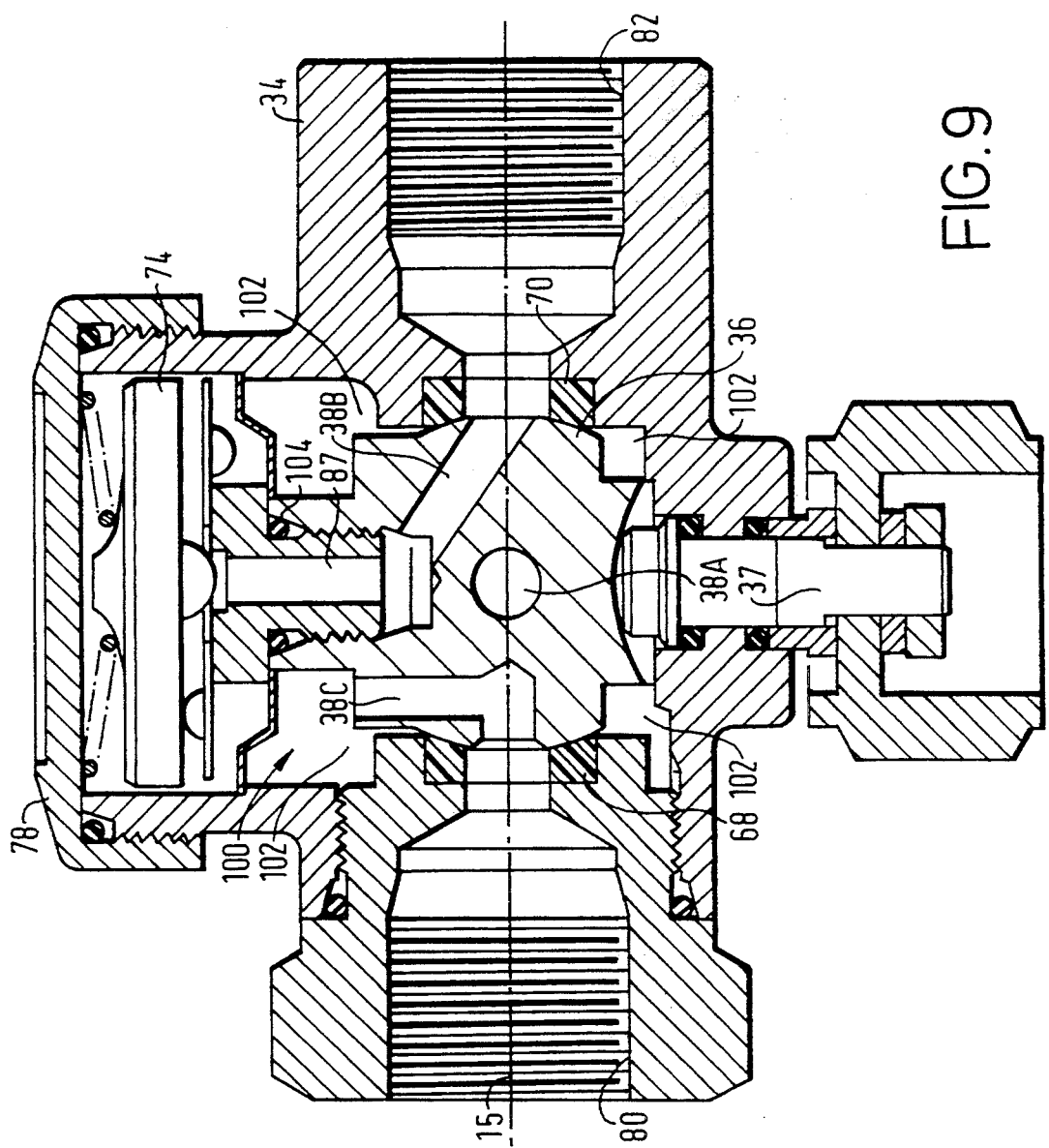
FIG. 9 shows a second unitary design of steam trap.

FIG. 9 shows a trap assembly comprising a steam trap with by-pass/isolating valve integrally formed as a single unit, similar to the embodiment shown in FIG. 8, and similar components have been given the same reference numbers. However, the valve element 36 and the steam trap capsule 74 are formed as a single unit, such that the steam trap capsule 74 is adapted for rotation with the valve element 36. The housing 34 defines a chamber 100 the lower region of which accommodates the valve element 36. The valve element 36 only partially occupies the lower portion of the chamber 100 such that there remains an unoccupied region 102 of the valve chamber.

The construction of the by-pass/isolation valve corresponds largely to that shown in FIGS. 7 and 8. Thus, the valve element 36 has a part-spherical configuration having the three passageways 38A, 38B and 38C. The direction of flow across the valve element 36, through the housing 34, corresponds to that shown in FIG. 8. In the embodiment shown in FIG. 9, the third connection passageway 38C enables the inlet passage 80 to be connected with the unoccupied region 102 of the valve chamber 100. The seals 68 and 70 prevent communication of the inlet passage 80 and the outlet passage 82, respectively with the unoccupied region 102 of the valve chamber 100. An inlet side of the steam trap capsule 74 also communicates with the region 102.

The outlet side of the steam trap capsule 74 is again connected to the valve chamber by a transfer duct 87. However, the steam trap capsule 74 and the valve element 36 are formed as a unitary assembly, and the transfer duct 87 is defined by this assembly. The construction of the assembly is such as to prevent communication of the transfer duct 87 with the unoccupied region 102 of the valve chamber 100. Thus, in the embodiment shown in FIG. 9, the valve element and steam trap capsule assembly has a sealing ring 104. The second connecting passageway 38B enables the outlet side of the steam trap capsule to be connected through the transfer duct 87 to the outlet passage 82, as in the embodiment shown in FIG. 8.

Figure 10:
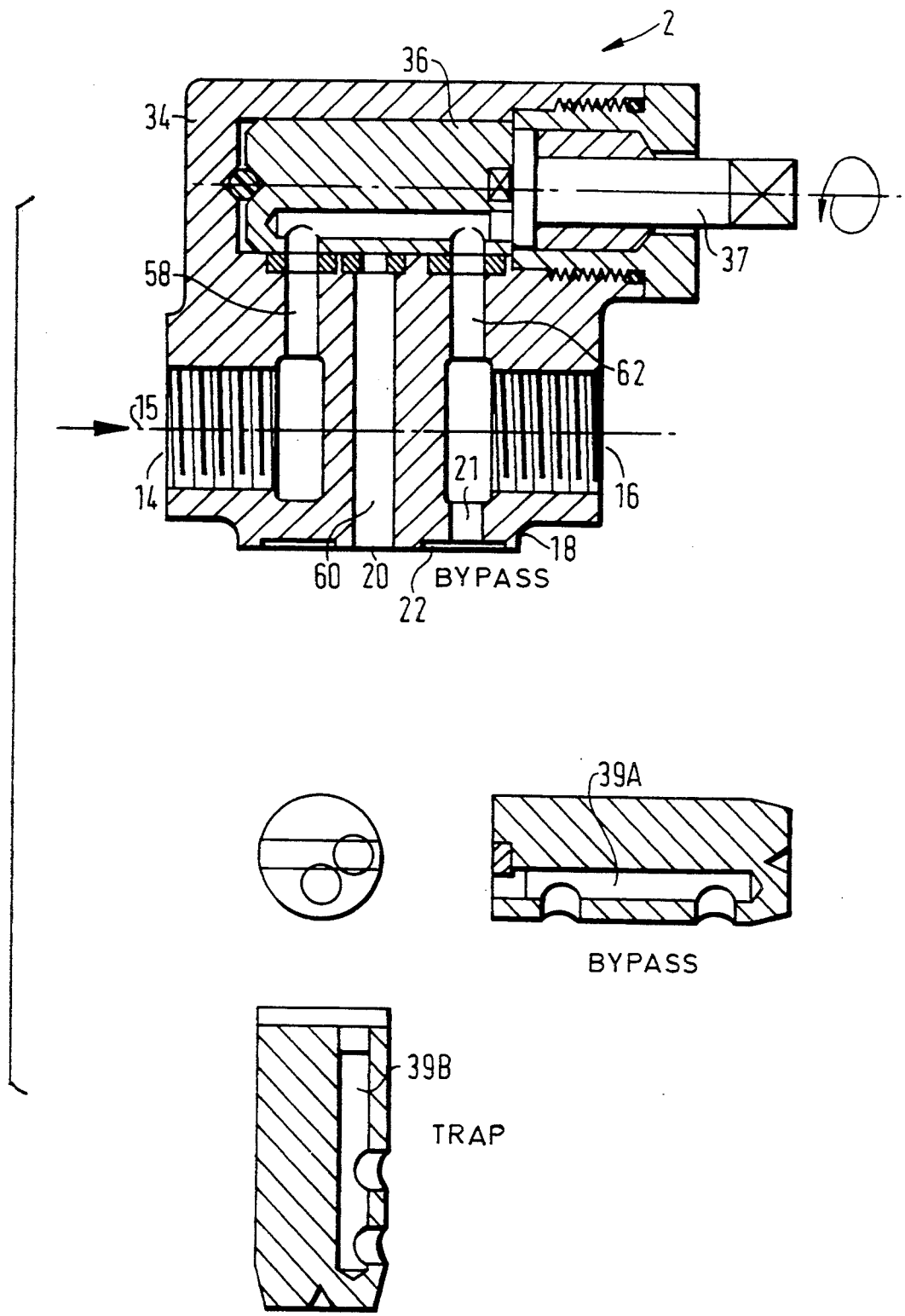
FIG. 10 corresponds to FIG. 3 but shows a sixth form of valve arrangement.

The valve body 2 shown in FIG. 10 differs from those shown in FIGS. 3 to 9 in that the axis of rotation 17 of the valve element 36 is parallel to the common axis 15 of the inlet and outlet passages 14,16. The valve element 36 is cylindrical, the longitudinal axis of the element 36 being parallel with the common axis 15. A first connecting passage 58 extends, perpendicularly to the two axes 15,17, between the inlet passage 14 and a peripheral region of the valve element 36. A second connecting passage 60 extends from the transfer port 20, parallel to the first connecting passage, to an adjacent peripheral region of the valve element 36. A third connecting passage 62 extends from the outlet passage 16 to another peripheral region of the valve element 36. The outlet passage 16 is also connected to the transfer port 22 of the valve body 2 by the passage 21.

The valve element 36 has four ports. Two ports are connected by a first internal passageway 39A and the remaining two ports are connected by a second internal passageway 39B. The angular orientation of the valve element 36 determines which ports are located adjacent the connecting passages 58,60,62. The two passageways 39A, 39B extend longitudinally within the valve element 36 near to the surface of the element 36, at different positions around the valve element.

Each embodiment of the valve body 2 shown in FIGS. 3 to 9 operates in the same way, in the sense that the same fluid connections may be achieved by appropriate positioning of the valve element 36.

In use, fluid enters the inlet passage 14,80 of the valve body 2. The valve body 2 has three modes of operation.

In a first operative mode, normal use of the steam trap may be selected. This selection is made by appropriate positioning of the knob 12 which alters the angular position of the valve element 36. For example, the angular position of the valve element 36 as shown in FIG. 6 is such that normal use of the steam trap is selected. The inlet passage 14 is connected to the transfer port 20 of the connection face 18. In FIG. 6, this connection is made by the second passageway 38B. Thus, fluid is transferred from the inlet passage 14 to the transfer port 20 which in turn communicates with the inlet port 30 of the condensate trap 4. The outlet port 32 of the trap 4 is connected to the transfer port 22 which communicates with the outlet passage 16. Thus the inlet passage 14 and the outlet passage 16 are connected through the condensate trap 4. In the embodiments of the assembly shown in FIGS. 1 to 6 and 9, the transfer port 22 (the outlet side of the steam trap) communicates directly with the outlet by means of the passage 21. However, in the embodiment shown in FIG. 7, the connection between the transfer port 22 and the outlet passage 16 is by means of the third connecting passageway 38C within the valve element 36. In the embodiment shown in FIG. 8, the second connecting passageway 38B of the part-spherical valve element 36 connects the outlet side of the steam trap capsule 74 to the outlet passage 82. Thus, the outlet passage 16,82 in FIGS. 7 and 8 and the outlet side of the steam trap are only connected when the valve element 36 is in the position corresponding to normal operation of the steam trap.

A second mode of operation is to by-pass the condensate trap. For example, the valve body 2 shown in FIG. 3 is in this operative mode. The inlet and the outlet passages are connected directly to each other. In FIG. 3, this connection is made by the first passageway 38A. The transfer port 20 of the connection face 18, which is connected to the inlet side of the condensate trap 4, is in an isolated condition. Therefore fluid passes directly from the inlet passage 14 to the outlet passage 16 without going through the steam trap 4. In the embodiments shown in FIGS. 7 and 8, the inlet side and the outlet side of the steam trap are then isolated from the inlet passage 14,80 and the outlet passage 16,82.

The third mode of operation is one in which the inlet passage 14 of the valve body 2 is totally isolated, which enables removal of the steam trap 4 for servicing or replacement. In the embodiment of the valve body 2 shown in FIG. 5, the valve element 36 is in this "stop" position. As can be seen, the inlet passage 14 is isolated from the outlet passage 16 and from the steam trap. In the embodiments of the arrangement shown in FIGS. 1 to 6, when this "stop" position is selected, the outlet passage of the valve body 2 communicates directly with the transfer port 22 (which is connected to the steam trap outlet side), and may also communicate with the transfer port 20 (which is connected to the steam trap inlet side), as can be seen in FIG. 5. As a result, when isolating the steam trap, the steam trap outlet side is still exposed to the downstream pipe connected to the outlet passage 16. Although this may not give rise to problems in removing the steam trap, because the outlet passage 16 is not under high pressure, it may be preferred to completely isolate the steam trap before removing it. Thus, the embodiment shown in FIGS. 7, 8 and 9 achieves this total isolation of the steam trap by replacing the passage 21 in the body 2 with a passageway in the valve element 36. When the valve element 36 is in the "stop" or "bypass" position, the steam trap can be removed (FIG. 7) or the cap 78 can be removed to provide access to the capsule 74 (FIGS. 7, 8 and 9).

A further advantage of the arrangements shown in FIGS. 1 to 7 and 10 is that the valve body 2 may be rotated relatively to the condensate trap 4 to facilitate the connection of the valve body 2 into the fluid line.

Although FIG. 1 shows a condensate trap assembly in which the condensate trap is depicted as a balanced pressure thermodynamic steam trap, it is possible for other types of condensate trap to be fitted to the valve body 2, such as inverted bucket steam traps and thermodynamic steam traps. By providing uniform connection surfaces 28 for a range of different condensate traps, simple interchangeability can be provided.

I claim:
1. A condensate trap assembly comprising:
   a valve body;
   a valve chamber defined within the valve body;
   a valve element which partially occupies the valve chamber, thereby defining an unoccupied region of the valve chamber, the valve element being housed for rotation about an axis within the valve body;
   an inlet passage and an outlet passage of the valve body which open into the valve chamber at an inlet passage port and an outlet passage port, respectively:
   a transfer duct which communicates with the valve element and which opens into the valve chamber at a respective port which is disposed on the axis of rotation of the valve element; and
   seals disposed at the inlet and outlet passage ports, the valve element having a surface which is contacted by the seals thereby sealing the inlet and outlet passages from the unoccupied region of the valve chamber, the valve element having first, second and third passageways, and the valve element being disposed within the chamber for movement between three operative positions, in which, respectively:
   (i) the inlet passage port and the outlet passage port are closed by the valve element;
   (ii) the inlet passage port communicates with the outlet passage port through the first passageway in the valve element, and
   (iii) one of the inlet passage port and the outlet passage port communicates with the unoccupied region of the valve chamber through the second passageway in the valve element, and the other of the inlet passage port and the outlet passage port communicates with the transfer duct through the third passageway in the valve element, means being provided for preventing di- rect communication between the transfer duct and the unoccupied region of the valve chamber.

2. A condensate trap assembly as claimed in claim 1 in which the operative position of the valve is determined by the angular position of the valve element within the valve body.

3. A condensate trap assembly as claimed in claim 2 in which the inlet and the outlet passages are aligned on a common axis.

4. A condensate trap assembly as claimed in claim 3 in which the axis of rotation of the valve element is perpendicular to the common axis of the inlet and the outlet passages.

5. A condensate trap assembly as claimed in claim 1 in which the valve element is part-spherical in shape.

6. A condensate trap assembly as claimed in claim 1 in which the second passageway is offset from the axis of rotation of the valve element and communicates with the unoccupied region of the valve chamber in all operative positions of the valve element.

7. A condensate trap assembly as claimed in claim 1, further comprising a steam trap element which is secured to the valve element.

8. A condensate trap assembly as claimed in claim 7, in which the steam trap element has an inlet and an outlet, one of the inlet and the outlet communicating with the transfer duct, and the other of the inlet and the outlet communicating with the unoccupied region of the valve member.

* * * * *